INVENTORS
John C. Rice
Kenneth Thompson
BY
Moses, Nolte, & Nolte
ATTORNEYS 3,076,720
COATED PAPER AND POLYOLEFIN AND METHOD OF COATING
John C. Rice, Tenafly, N.J., and Kenneth Thompson, Hamilton, Ohio, assignors to Lowe Paper Company, Ridgefield, N.J., a corporation of New Jersey
Filed Oct. 17, 1960, Ser. No. 63,147
16 Claims. (Cl. 117—15)

This application is a continuation-in-part of application Serial No. 586,956, filed May 24, 1956, now abandoned; Serial No. 692,342, filed October 25, 1957, now U.S. Patent No. 2,955,970; and application Serial No. 747,340, filed July 9, 1958, now abandoned.

This invention relates to the treatment of polyolefinic materials, and particularly polyethylene to improve its usefulness.

Polyethylene films are tough, semi-transparent, resistant to many chemicals and heat sealable. Because of these properties they are highly useful as packaging and wrapping materials. Furthermore, polyethylene may be readily extrusion coated onto a web backing and there is thus prepared a packaging material which acquires the desirable attributes of the polyethylene film.

Among the difficulties encountered with the use of polyethylene either in the form of a film or coated on a web backing has been that the material printed with standard printing inks, which are usually oil-based inks, did not retain the ink. In ordinary handling it was soon found that the ink was smeared or rubbed off.

It is known in the prior art that the ability of polyethylene to retain inks and certain coatings may be improved by subjecting the surface of the polyethylene materials to an activation treatment. This activation treatment has taken many forms. Thus, for example, it has been suggested that the surface be subjected to chemical oxidation treatment, flame treated, exposed to ozone, chlorine, acid and/or electrical bombardment, etc.

In the commerce of this industry it is the usual practice for the polyethylene film or coated web material to be manufactured at one place and then transported to the printer who applied the printing material. In the handling (e.g. friction contact with rollers and machine parts, etc.) of this material it was found that the acitvated surface was soon lost. Furthermore, in the ordinary handling, shipping and processing of the materials within a plant it was also found that the activated surface was soon lost. This problem was found to be most acute with polyethylene coated boxboard. The boxboard, after coating with polyethylene and after surface oxidation of the polyethylene, is subjected to various cutting, stacking and other handling operations wherein one sheet slides over another sheet. In this case the loss of the activated polyethylene surface was particularly marked.

Another drawback encountered in the use of polyethylene in the packaging art was that it could not be properly glued and particularly could not be glued with the low-cost dextrin and starch adhesives. Even the activated polyethylene surfaces left much to be desired in this regard. The limited gluability of the activated polyethylene surface was also found to be transient in character and soon lost in handling and abrasion.

It is an object of the present invention to provide a process for preserving the printability and gluability of activated polyolefin surfaces.

It is also an object of the present invention to provide a process (and the product thereof) for manufacturing packaging materials including activated polyethylene which have good printability and gluability characteristics.

These and other more detailed objects will be apparent from the following description and drawings.

By "activation," "active," and "activated," as used in the specification and the appended claims, it is intended to include, inter alia, processes, such as flame treatment, corona, or other electric discharge treatment, chemical oxidation, ozonization, and high-temperature extrusion, where the result thereof is to render a polyolefin surface receptive to adhesives and oil-base printing inks.

It has now been discovered that the activated polyolefin surface, and particularly the activated polyethylene surface, may be preserved and the printability and gluability improved if the activated polyolefin surface soon after, and preferably substantially immediately after, the activation treatment is coated to a critical extent with a non-polymerizing, polar, hydrophilic aqueous phase coating composition. After this treatment the coated material may be dried and then subjected to a printing operation even with oil-based inks, and then to a gluing operation and, if desired, using even the inexpensive dextrin and starch adhesives.

It has been found that the printability and gluability of the activated polyolefin surface is preserved if it is coated with a non-polymerizing, polar, hydrophilic aqueous phase coating at coating weights (on a dry base) of from 0.07 pound to 1.4 pounds per 1000 sq. ft. of surface of the polyolefin surface. In this aspect of the invention the coating is preferably non-pigmented. By experimentation applicants have found that with coatings below these limits the activated polyolefin material soon lost its printability and gluability. With coatings above this range, the printability of the activated polyolefin material was masked and also lost.

Although applicants do not wish to be bound by any theory of operation of the present invention, the criticality of the amount of coating applied to the activated polyolefin surface can be explained as follows.

The aqueous phase top-coat when applied within the critical prescribed weight coating level to the activated polyolefin surface forms a porous superstructure of protection over the activated polyolefin surface. As a result of the lattice-like porous nature of the top-coat in the prescribed weight coat ranges, there is accessible activated polyolefin area which retains its readily efficient receptive nature.

The top-coat superstructure in turn acts as a protective mechanical barrier preventing the exposed surface of activated polyolefin beneath it from being abraded by rubbing against other sheets of materials or the machines which handle them.

Therefore, because of the protective porous top-coat, the deficiencies of the activated polyolefin surface, that is, its extremely transient nature and its extremely poor abrasion resistance are completely overcome.

In the case where there is an insufficient weight coat level of the topcoat there is an excess of exposed activated polyolefin making the topcoat ineffectual as a protective barrier. Thus, the over exposed activated polyolefin will revert back to its original nature and retain its normal deficiency of poor abrasion resistance.

When there is an excess of protective topcoat the activated areas of polyolefin are entirely masked and covered and thus receptivity is lost.

In accordance with the present invention particularly good results are obtained with aqueous coating solutions wherein the principal solid constituents are either proteins or carbohydrates. In these cases, in addition to the above mechanism it is thought that an additional mechanism is operating. In these instances the facts are the same. Where too little coating solids are present, the activated polyolefin soon loses its activation and does not retain the printing inks or glue, whereas when too much is employed the activation is masked. In this case, however, in addition to the proper distribution of the porous topcoats it is believed that the coatings themselves are altered by virtue of their reaction with activated polyolefin surface. This change in chemical character of the principal coating agent would help explain why the ordinary hydrophilic protein and carbohydrate overcoatings, which are normally not ink receptive to hydrocarbon or resin based inks, when applied to the activated olefin surface coated in accordance with the present invention are highly receptive to these inks. This change in chemical character also helps explain why these coatings when applied to the activated polyolefin surface are compatible with and receptive to both the hydrophobic inks as well as the hydrophilic adhesives.

In either case we have discovered the unusual and unique fact that by top-coating in the prescribed level as mentioned an activated polyolefin surface we come up with an unexpected product to which we have imparted permanent receptivity to glues and ink by incorporating the efficiencies of both the hydrophobic polyolefin surface and the hydrophilic top-coat and completely eliminating the deficiencies of both.

The process of the present invention is applicable to polyolefin or polyethylene in a variety of forms. However, it has its greatest value in the treatment of activated polyethylene films per se or webs which have been extrusion coated with polyethylene.

As used herein, the term polyolefin refers to the polymeric resins formed through the homopolymerization of an aliphatic monoethylenic unsaturated hydrocarbon, or through the copolymerization of two or more unsaturated hydrocarbons. The monomers from which the polyolefin is prepared are preferably the lower alkenes which are straight chain or branched chain. By way of illustration, the following polyolefins may be mentioned: polyethylene, polypropylene, polyalphabutylene, polyisopropyl propylene, polyisopropyl butene, etc.

Any backing capable of being extrusion coated with a polyolefin, and particularly polyethylene, is useful in the present invention. The backing, however, should be a suitable one for use in packaging. Among the suitable backing materials may be mentioned kraft paper, boxboard substrates, cloth, foil, cellophane, etc. Of particular utility are the cellulosic backings such as kraft paper and boxboard substrates.

The advantages of using a hydrophilic, polar topcoat on the polyolefin surface are: (1) it greatly lowers tendency of the film to build up static charge, (2) improves the slip resistance of the material, (3) improves the uniformity of the surface, and (4) adds additional resistance to grease and oils. By improving uniformity is meant that the present topcoat avoids the minute imperfections due to the heat treatment which is characteristic of the prior art heat-treated polyethylene films. One of the major problems of the prior art processes is the difficulty in obtaining uniform oxidation of the polyethylene surface. For this reason these prior art processes have not gained wide acceptance. In contrast to this the present process provides a finished product wherein the surface has a high degree of uniformity.

As mentioned above, the topcoats that are most suitable for the present invention are hydrophilic and polar. In a preferred form of this invention the topcoats are also non-polymerizing. Among the useful topcoat materials may be mentioned starch, carboxymethyl cellulose, proteins (e.g. gelatin, casein), polyvinyl alcohol, polyvinyl acetate, Methocel, etc. One typical topcoat formula consists of a 10% solution of Penford Gum 260, which is a hydroxy ethyl ether derivative of cornstarch. A second topcoat formulation consists of soybean protein (or alternatively casein), which is dissolved with an excess of ammonium hydroxide in the presence of zinc sulfate. The composition is as follows:

| | Parts by weight |
|---|---|
| Protein | 100 |
| Water | 683 |
| Zinc sulfate | 5.12 |
| Ammonia (NH$_4$OH) (26° Bé.) | 26.50 |

A variety of methods are known in the prior art for the activation of the polyolefin surface to make it receptive to printing inks. As previously noted, they involve flame oxidation, chemical oxidation, treatment with a variety of agents, ozone, chlorine, acid, electrical bombardment, etc. These may be employed in the present invention. In one preferred form of this invention the polyolefin film is surface oxidized with an open flame.

In the prior art it was thought that to activate extruded polyethylene it was essential to subsequently subject the extruded polyethylene to an activation or oxidation step. It has now been found that this is not essential and that the convential flame treatment, for example, may be dispensed with if the polyethylene surface is activated (oxidized) by extruding it at a minimum temperature of about 610° F. There is no upper limit to raising the temperature above 610° F. insofar as improved ink receptivity and gluability is concerned, but by exceeding 635° F. the polyethylene begins to break down chemically and gives rise to odor problems. This narrowness of the useful temperature range is probably the reason that the utility of an extrusion temperature between 610° F. and 635° F. eluded the previous observers. Polyethylene temperature has been measured by means of a pyrometer as the polyethylene melt exits from the die lips.

It has further been found that whatever change is effected in the polyethylene surface, by holding the extrusion temperature between 610° F. and 635° F. this change is only temporary insofar as gluability is concerned. In order to preserve gluability it is necessary to surface coat the 610° F–635° F. extruded polyethylene almost immediately with a hydrophilic coating (just as the same hydrophillic coating was found to be beneficial in preserving the glue and ink receptivity of flame-treated polyethylene).

In order to facilitate ready comprehension of this invention and for a proper appreciation of the salient features thereof, the invention is illustrated in the accompanying drawings forming part thereof, and in which.

The following examples are further illustrative of the present invention and it will be understood that the invention is not limited thereto.

*Example 1*

Figure 1:
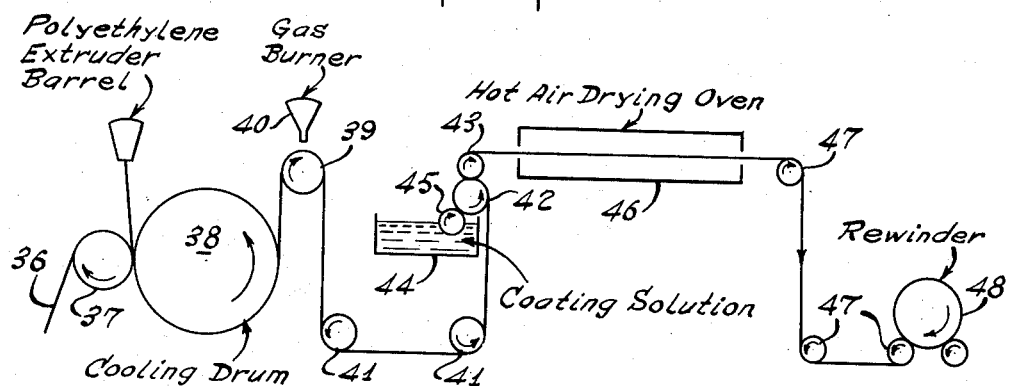
FIG. 1 is a schematic sectional view showing the apparatus involved in the present coating operation.

In FIG. 1 a web of kraft paper 36 is drawn from a reel (not shown) and is fed over a rubber faced roller 37 into a nip formed between the roller and a cooling drum 38. The polyethylene is coated to the kraft paper at the nip by any standard extrusion process common in the art. The polyethylene film coated paper so formed is then fed over a roller 39 and under a gas burner 40 where the surface of the polyethylene film to be topcoated is heated or oxidized.

The paper is run at a speed of approximately 200 f.p.m. and the gas burner having a maximum flame temperature of 3000° F. is set at a distance of from ½" to ¾" away from the surface of the polyethylene film so that the film passes through the oxidizing zone of the flame.

The treated polyethylene film is then carried by a series of rollers 41 into a nip formed between rollers 42 and 43. A coating solution containing

| | Pts. by weight |
|---|---|
| Soybean protein | 100 |
| Water | 683 |
| Zinc sulfate | 5.12 |
| Ammonia (NH$_4$OH) (26° Bé.) | 26.50 | is transferred from bath 44 by roller 45 to the surface of roller 42. This coating is then applied by roller 42 directly to the polyethylene film as it passes through the nip formed between rollers 42 and 43.

The coated polyethylene film is then carried to a hot air drying oven 46 where at a temperature between 120° F. and 150° F. the water is evaporated from the coating. The film is then taken over a series of rollers 47 to a rewind roller 48.

An alternative procedure for applying the topcoat employs the so-called "air knife" coating operation. An air knife coater consists of a roller of approximately 10" in diameter which rotates in a pan of coating and applies coating superfluously to a web. Immediately after passing over this roll the web is reversed over a breast roll. At this point the excess coating is blown off with a jet of air leaving the desired amount of coating material on the web. This air knife is described in U.S. Patent 1,590,417. The slot in the air knife is adjustable but is usually operated between .018 and .025 of an inch. Air pressure is usually maintained between 1.5 and 3.5 lbs. per sq. inch.

After the material is coated in this manner, it may be dried through a hot air circulating tunnel or on a festoon rack. In the present process we prefer a festoon rack with an air temperature of approximately 135° F. The coating is usually dried in this atmosphere for four or five minutes.

When film of polyethylene is to be treated in accordance with the present invention a roll of preformed polyethylene film may replace rolls 37 and 38 in FIG. 1. The film of polyethylene is directed under gas burner 40 and then subjected to the same treatment as the polyethylene coated kraft paper described above.

Example II

The first procedure described in Example I is followed except that a 10% aqueous solution of Penford Gum 260 is employed as the topcoat.

The synthetic polymers which can be used in the form of latex are styrene butadiene, butadiene acrylonitrile, various polyacrylates such as ethyl acrylate, ethyl methacrylate, polyvinyl acetate, polyvinyl acetateacrylate copolymers, polyvinyl chloride, chloride acetate copolymers, etc. The addition of synthetic polymers adds to the flexibility and thermoplasticity of the coating.

Figure 2:
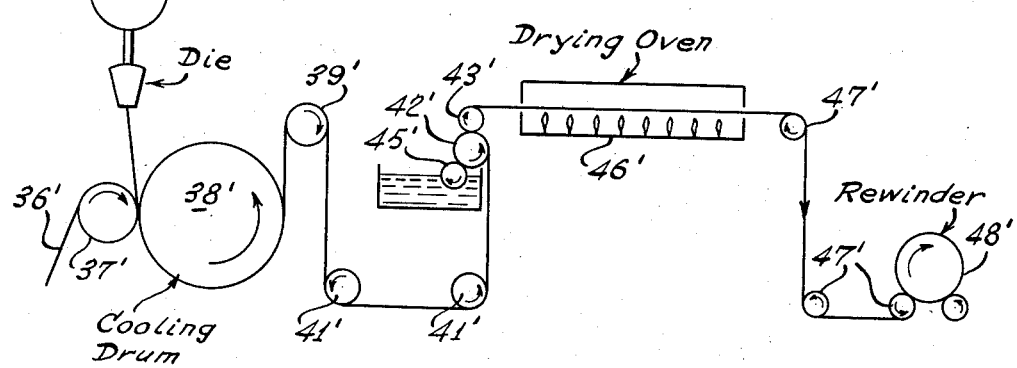
FIG. 2 is a schematic sectional view of a system which may be used in a modification of the present invention which does not require the flame treatment of the polyethylene surface.

The following examples are described in connection with FIG. 2.

Example III

The 610°–635° F. heated polyethylene film is extruded according to standard practice into the nip formed by a rubber face pressure roll 37' and a cooling drum 38' and there coated upon a paper web 36' which is simultaneously led into the same nip. Substantially immediately upon cooling, the polyethylene coated paper web is led to the coating device which consists of three rolls:

(1) A pickup roll 45'
(2) A metering transfer roll 42'
(3) A backing roll 43' to maintain uniformity of coating deposition from the transfer roll where the polyethylene surface is coated with a non-polymerizing, polar, hydrophilic coating (soya protein, 100 parts by weight; water, 638 parts by weight; ammonia (26° Bé.), 26.50 parts by weight; zinc sulfate, 5.12 parts by weight) at coating weights of 0.07 pound to 1.4 pounds per 1000 sq. ft. The polyethylene coated paper web is thereupon led through a series of dryers (gas burners 46') which are directed against the non-polyethylene coated side of the paper web; whereupon the polyethylene coated paper web is led to a take-off device 48'. This is practiced at speeds of 75–250 feet per minute.

The speed is only limited by the rated output of the extruder. Furthermore, any suitable coating and drying device will suffice to apply the non-polymerizing, polar, hydrophilic coating to the polyethylene surface.

Example IV

The procedure of Example III is followed using the following coating composition:

| | Parts by weight |
|---|---|
| Soya protein | 14 |
| Water | 84 |
| Ammonia (26° Bé.) | 2 |

Example V

The procedure of Example III is followed using the following coating composition:

| | Parts by weight |
|---|---|
| Casein | 14 |
| Water | 84 |
| Ammonia (26° Bé.) | 2 |

Example VI

The procedure of Example III is followed using the following coating composition:

| | Parts by weight |
|---|---|
| Starch | 9 |
| Water | 91 |

As previously pointed out, among the advantages of the present invention is that the materials coated in accordance with the present invention are readily printable and gluable. In particular it was pointed out that the organic based or oil based inks may be employed and the low-cost dextrin and starch adhesives. Although these inks and adhesives may be employed to advantage, other inks and adhesives may be used. The following are examples of typical printing and gluing operations to which the product of Example I has been subjected.

Example VII

A white lined news filled boxboard calipering 0.014" was coated on the white lined side with 1 mil of polyethylene which was activated incorporating a topcoat formulation of Example I, according to method described in said example. This product was then printed on a commercial 2-color Harris Offset Press using Pope & Gray's Gloss Offset Ink #RO11668W under standard printing conditions. The printed ink bond to the top-coated polyethylene surface was so tight as to resist all and any disruption of ink particles when cellophane tape was pressed tightly against the ink surface and pulled rapidly and vigorously away. This cellophane tape test is often used by printing industry to measure ink bond.

Example VIII

Carton blanks fabricated of news filled white lined boxboard containing on the news side a ¾ mil coating of polyethylene activated according to method outlined in Example I and top coated with an air knife coater using topcoat formulation as described in Example VI were glued on an International 6F straight line glue machine using a borated dextrine adhesive, National Adhesive #13–2260 at conventional carton sealing speeds.

The carton glue seam, when pulled apart at the end of the glue machine, tore fiber completely down the glue seam. This is considered excellent by all who are familiar with this operation.

Other types of printing inks may be employed which may be mentioned in the printing operation of Example VII, among which are Pope & Gray's RN10484, a letterpress ink, and IPI's Lithogem, a litho ink.

Although the low-cost dextrin and starch adhesives are most preferred, other adhesives may be used. Among these may be mentioned Union Paste and Glue's M718A, a resin emulsion type and United Paste and Glue's #5245, a rubber copolymer latex type adhesive.

While the invention has been described with particular reference to specific embodiments, it is to be understood that it is not limited thereto, but is to be construed broadly and restricted solely by the scope of the appended claims.

What is claimed is:

1. A polyolefin web adapted to be coated with printing inks or adhesives, comprising a film activated for receiving a printing ink or adhesive, said film having thereon a non-polymerizing, polar, aqueous-phase, hydrophilic overcoat at a weight of 0.07 to 1.4 lbs. on a dry basis per 1000 square feet of said polyolefin web for preserving the printing ink and adhesive receptivity of said active polyolefin film.

2. A composite web according to claim 1, further comprising a packaging material substrate.

3. A composite web according to claim 2, wherein said packaging material substrate is a paper product.

4. A web adapted to be coated on selected portions with printing inks or adhesives comprising a polyolefin film activated for receiving a printing ink or adhesive, said film having thereon a non-polymerizing, polar, aqueous-phase, hydrophilic overcoat at a weight of 0.07–1.4 lbs. on a dry basis per 1000 square feet of polyolefin web further comprising adhesive or printing ink on certain selected portions of said overcoat.

5. A packaging material comprising a paper product base, an active polyethylene coating thereon, a soybean protein overcoat applied onto said polyethylene coating in an aqueous phase at a weight of 0.07 to 1.4 pounds on a dry basis per 1,000 square feet of polyethylene surface, and adhesive or printing ink on certain selected portions of said overcoat.

6. In combination an active polyolefinic surface adapted for receiving thereon printing inks or adhesives, and an overcoat consisting of a non-polymerizing, polar, aqueous-phase, hydrophilic composition applied at a weight of 0.07 to 1.4 pounds on a dry basis per 1,000 square feet of polyolefinic surface, for preserving the printing ink and adhesive receptivity of said active polyolefin surface.

7. In the combination according to claim 6, wherein the polyolefinic surface is a polyethylenic surface.

8. A method for preparing a polyolefin web for ink and adhesive receptivity, which comprises the steps of activating the surface of a polyolefin web, and applying onto the active surface a non-polymerizing, polar, aqueous-phase, hydrophilic overcoat at a weight of 0.07 to 1.4 lbs. on a dry basis per 1000 square feet of said polyolefin web to maintain the polyolefin surface in its active condition for receiving printing inks and adhesives.

9. A method for preparing a polyolefin web which comprises the steps of activating the surface of said web, and applying to the active surface a non-polymerizing, polar, aqueous phase hydrophilic overcoat at a weight of 0.07 to 1.4 lbs. on a dry basis per 1000 square feet of said polyolefin web, said method further including the steps of applying an adhesive or printing ink on certain selected portions of said overcoat.

10. A method according to claim 9, further comprising the step of initially extruding the polyolefin web onto a packaging material substrate.

11. A method according to claim 10, wherein said packaging material substrate is a paper product.

12. A method for preparing a composite web, which comprises extruding on a paper product web a polyethylene film, activating the surface of said polyethylene film, substantially immediately thereafter coating said active surface with an aqueous phase soybean protein coating composition applied at a weight of 0.07 to 1.4 pounds on a dry basis per 1,000 square feet of film surface, drying said coating, and thereafter gluing or printing on selected parts of said coating.

13. A method for preserving the adhesive and oil based printing ink retentiveness of a polyolefin surface made active by extrusion of the polyolefinic web at temperatures between 610° F. and an upper temperature at which the polyolefin breaks down which comprises the steps of coating said surface substantially immediately after extrusion with a polar, non-polymerizing, aqueous-phase, hydrophilic coating at a weight of 0.07 to 1.4 pounds on a dry basis per 1,000 square feet of said polyolefinic surface and drying said coating.

14. A method according to claim 13, further comprising the steps of subjecting the coated surface to printing and gluing on selected parts thereof.

15. A method according to claim 13, wherein the polyolefin is polyethylene and said upper temperature is 635° F.

16. A method of preparing a composite web, which comprises extruding on a paper product web a polyethylene film at a temperature between 610° and 635° F., substantially immediately thereafter coating said film with an aqueous-phase soybean protein coating composition applied at a weight of 0.07 to 1.4 pounds on a dry basis per 1,000 square feet of film surface, drying said coating, and thereafter gluing and printing on selected parts of said coating.

References Cited in the file of this patent

UNITED STATES PATENTS

| | | |
|---|---|---|
| 2,287,161 | Ball | June 23, 1942 |
| 2,668,134 | Horton | Feb. 2, 1954 |
| 2,683,894 | Kritchever | July 20, 1954 |
| 2,714,571 | Irion | Aug. 2, 1955 |
| 2,759,847 | Frost | Aug. 21, 1956 |
| 2,795,820 | Grow | June 18, 1957 |
| 2,829,118 | Wehr | Apr. 1, 1958 |
| 2,878,519 | Wolinski | Mar. 24, 1959 |
| 2,955,970 | Rice et al. | Oct. 11, 1960 |
| 2,968,576 | Keller et al. | Jan. 17, 1961 |